United States Patent Office 2,985,526
Patented May 23, 1961

2,985,526
COMPOSITE RUBBER BASE PROPELLANTS AND PROCESS OF PREPARATION EMPLOYING NON-SULFUR METALLIC CURING AGENTS
Eugene D. Guth, Bartlesville, Okla., assignor to Phillips Petroleum Company, a corporation of Delaware
No Drawing. Filed Nov. 19, 1956, Ser. No. 622,741
18 Claims. (Cl. 52—.5)

This invention relates to novel and improved solid propellants and to an improved process for preparing propellants. A specific aspect of the process pertains to an improved process for curing propellant binders.

Solid propellants for rocket motors and similar uses are formed by compounding a solid oxidizer and a binder containing a rubbery copolymer of a conjugated diene with a polymerizable heterocyclic nitrogen base of the pyridine series together with certain compounding agents for curing the binder composition. A burning rate catalyst and various other agents which affect the burning characteristics of the propellant are generally incorporated in the propellant. Curing agents which are conventional in the synthetic rubber art are frequently utilized in curing the copolymer of the binder or propellant composition.

In the production of such solid propellant compositions, it is desirable that the products have good mechanical properties such as high values of elongation and tensile strength, low modulus characteristics, as well as good burning rates and that these mechanical properties obtain in the cured propellant composition even after a substantial aging period. It is inevitable that these solid propellant compositions will be maintained in storage for varying lengths of time and it is of particular importance that their physical and ballistic characteristics remain unaltered insofar as it is possible.

This invention is concerned particularly with improved curing agents for curing the binder or copolymer in the binder and with reducing and controlling the curing time with novel curing agents.

Accordingly, it is an object of the invention to provide novel and improved solid propellants. Another object is to provide a novel and improved method for preparing propellants. A further object is to provide a faster method of curing a propellant binder or propellant composition. It is also an object of the invention to provide a self-curing binder recipe which does not require sulfur. Other objects of the invention will become apparent from a consideration of the accompanying disclosure.

I have found that the water-soluble salts of nickel and cobalt are excellent curing agents for propellant compositions and propellant binders which comprise a copolymer of a conjugated diene and a heterocyclic nitrogen base in admixture with at least one oxide of a metal of the group magnesium and zinc. The composition may also include other agents which modify the curing of the composition as well as the burning characteristics thereof. Such agents are conventional in propellant manufacture and include reinforcing agents, plasticizers, wetting agents, anti-oxidants, vulcanization accelerators, sulfur, etc.

U.S. Patent 2,395,506, issued to Sauser, discloses the curing of synthetic rubber using cobalt and/or nickel oxides as well as other bivalent metal oxides. I have found that the salts of cobalt and/or nickel are not curing agents for synthetic rubber but, contrary to expectations, are curing agents for solid rocket propellant recipes. These metal salts provide instant curing of the recipes even when utilized in very minor amounts. Nickel and cobalt salts which are effective in the process include the chlorides, nitrates, sulfates, etc. In fact any water-soluble salt of cobalt or nickel is effective.

The amount of salt of cobalt and/or nickel admixed with the solid propellant recipes may vary widely, but in general, it is preferred to employ from 0.05 to 10 parts by weight of the salt for each 100 parts by weight of the propellant recipe and more desirably 0.5 to 5 parts of the salt for each 100 parts of recipe. Curing times can be controlled in the range of ½ minute to 8 hours at temperatures in the range of 85 to 175° F. It is essential that the copolymer be formed before addition of the nickel and/or cobalt salt because of the difficulty in preventing reaction of these salts with the heterocyclic nitrogen base to form a complex therewith which does not effect curing of the copolymer-containing propellant binder.

The rubbery polymers employed as binders in the solid propellant compositions of this invention are copolymers of conjugated dienes with polymerizable heterocyclic nitrogen bases of the pyridine series. These copolymers can vary in consistency from very soft rubbers, i.e., materials which are soft at room temperature but will show retraction when relaxed, to those having a Mooney value (ML-4) up to 100. The rubbery copolymers most frequently preferred have Mooney values in the range between 10 and 40. A rubbery conjugated diene-heterocyclic nitrogen base copolymer of a Mooney viscosity in the range of 10-100 (ML-4) and having been prepared by the polymerization of a mixture of monomers comprising at least 50 percent by weight of conjugated diene is effective in the binder of the invention. They may be prepared by any polymerization methods known in the art, e.g., mass or emulsion polymerization. One convenient method for preparing these copolymers is by emulsion polymerization at temperatures in the range between 0 and 140° F. Recipes such as the iron pyrophosphate-hydroperoxide, either sugar-free or containing sugar, the sulfoxylate, and the persulfate recipes are among those which are applicable. It is advantageous to polymerize to high conversion as the unreacted vinylpyridine monomer is difficult to remove by stripping.

The conjugated dienes employed are those containing from 4 to 6 carbon atoms per molecule and include 1,3-butadiene, 2-methyl-1,3-butadiene, 2,3-dimethyl-1,3-butadiene, and the like. Various alkoxy, such as methoxy and ethoxy and cyano, derivatives of these conjugated dienes are also applicable. Thus, other dienes, such as phenylbutadiene, 2,3-dimethyl-1,3-hexadiene, 2-methoxy - 3 - ethylbutadiene, 2 - ethoxy - 3 - ethyl - 1,3-hexadiene, 2-cyano-1,3-butadiene, are also applicable in the preparation of the polymeric binders of this invention.

Instead of using a single conjugated diene, a mixture of conjugated dienes can be employed. Thus, a mixture of 1,3-butadiene and isoprene can be employed as the conjugated diene portion of the monomer system.

The polymerizable heterocyclic nitrogen bases which are applicable for the production of the polymeric materials are those of pyridine, quinoline, and isoquinoline series which are copolymerizable with a conjugated diene and contain one, and only one,

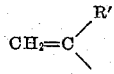

substituent wherein R' is either hydrogen or a methyl group. That is, the substituent is either a vinyl or an alpha-methyl-vinyl (isopropenyl) group. Of these, the compounds of the pyridine series are of the greatest interest commercially at present. Various substituted derivatives are also applicable but the total number of carbon atoms in the groups attached to the carbon atoms of the heterocyclic nucleus should not be greater than 15 because the polymerization rate decreases somewhat with increasing size of the alkyl group. Compounds where the alkyl substituents are methyl and/or ethyl are available commercially.

These heterocyclic nitrogen bases have the formula

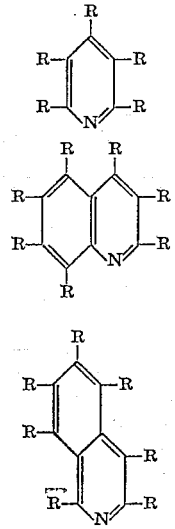

or where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of the said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl - 2 - vinylpyridine; 3 - ethyl - 5 - vinylpyridine; 2,6 - diethyl - 4 - vinylpyridine; 2 - isopropyl - 4 - nonyl-5-vinylpyridine; 2-methyl-5-undecyl-3-vinylpyridine; 2,4-dimethyl - 5,6 - dipentyl - 3 - vinylpyridine; 2 - decyl-5 - (alpha - methylvinyl)pyridine; 2 - vinyl - 3 - methyl-5 - ethylpyridine; 2 - methoxy - 4 - chloro - 6 - vinylpyridine; 3-vinyl-5-ethoxypyridine; 2-vinyl-4,5-dichloropyridine; 2 - (alpha - methylvinyl) - 4 - hydroxy - 6 - cyanopyridine; 2 - vinyl - 4 - phenoxy - 5 - methylpyridine; 2 - cyano - 5 - (alpha - methylvinyl)pyridine; 3 - vinyl-5 - phenylpyridine; 2 - (para - methylphenyl) - 3 - vinyl-4 - methylpyridine; 3 - vinyl - 5 - (hydroxyphenyl)-pyridine; 2 - vinylquinoline; 2 - vinyl - 4 - ethylquinoline; 3 - vinyl - 6,7 - di - n - propylquinoline; 2 - methyl - 4-nonyl - 6 - vinylquinoline; 4 - (alpha - methylvinyl) - 8-dodecylquinoline; 3-vinylisoquinoline; 1,6-dimethyl-3-vinylisoquinoline; 2 - vinyl - 4 - benzylquinoline; 3 - vinyl-5-chloroethylquinoline; 3-vinyl-5,6-dichloroisoquinoline; 2 - vinyl - 6 - ethoxy - 7 - methylquinoline; 3 - vinyl - 6-hydroxymethylisoquinoline; and the like.

Oxidants which are applicable in the solid propellant compositions of this invention include ammonium, alkali metal, and alkaline earth metal salts of nitric, perchloric, and chloric acids, and mixtures thereof. Ammonium nitrate and ammonium perchlorate are the preferred oxidants for use in the solid rocket fuels of this invention. Specific oxidants include sodium nitrate, potassium perchlorate, lithium chlorate, calcium nitrate, barium perchlorate, and strontium chlorate. Mixtures of oxidants are also applicable. In the preparation of the solid rocket propellant compositions, the oxidants are powdered to sizes preferably 300 to 10 microns average particle size. The amount of solid oxidant employed is usually a major amount of the total composition and is generally in the range between 50 and 90 percent by weight of the total mixture of oxidant and binder. If desired, however, less than 50 percent by weight of the oxidant can be used.

Combustion rate catalysts applicable in the invention include ammonium dichromate and metal ferrocyanides and ferricyanides. Ferric ferrocyanides, such as Prussian, Berlin, Hamburg, Chinese, Paris, and Milori blue, soluble ferric ferrocyanide, such as soluble Berlin or Prussian blue which contains potassium ferric ferrocyanide, and ferric ferrocyanide which has been treated with ammonia, are among the materials which can be used. Ferrous ferricyanide, Turnbull's blue is also applicable. A particularly effective burning rate catalyst is Milori blue which is pigment similar to Prussian blue but having a red tint and is prepared by the oxidation of a paste of potassium ferrocyanide and ferrous sulfate. Other metal compounds such as nickel and copper ferrocyanides can also be employed. The amount of burning rate catalyst used, in the propellant compositions of this invention, are usually in the range of 0 to 15 parts by weight per 100 parts of oxidant and binder mixture with 1 to 4 parts per 100 parts of oxidant and binder mixture being preferred.

The binder contains a rubbery copolymer of the type hereinbefore described and, in addition, there may be present one or more reinforcing agents, plasticizers, wetting agents, and antioxidants. Other ingredients which may be employed in the binder comprise vulcanizing accelerators, vulcanizing agents, accelerator activators, etc. Sulfur may be included as a vulcanizing agent but is not required.

A general formulation for a binder composition useful in the invention comprises:

| | Parts by weight [1] |
|---|---|
| Rubbery copolymer (as hereinbefore described) | 100 |
| Reinforcing agent | 0–50 |
| Plasticizer | 0–100 |
| Wetting agent | 0–10 |
| Antioxidant | 0–3 |
| Vulcanization accelerator | 0–5 |
| Magnesium oxide | 0–5 |
| Zinc oxide | 0–5 |

[1] Per 100 parts of copolymer.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins.

In general, any rubber plasticizers can be employed in these binder compositions. Materials such as Pentaryl A (amylbiphenyl), Paraflux (saturated polymerized hydrocarbon), Circosol-2XH (petroleum hydrocarbon softener having a specific gravity of 0.940 and a Saybolt Universal Viscosity at 100° F. of about 2000 seconds), di(1,4,7-trioxaundecyl)methane designated as TP-90B, and dioctyl phthalate are suitable plasticizers. Materials which provide rubber having good low temperature properties are preferred. It is also frequently preferred that the plasticizers be oxygen-containing materials.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N'-diphenyl-p- phenylenediamine), phenyl-beta-naphthylamine, 2,2-methylene-bis(4-methyl-6-tert-butylphenol), and the like. Rubber antioxidants, in general, may be employed or if desired may be omitted.

Examples of vulcanization accelerators include the carbamate type, such as N,N-dimethly-S-tert-butylsulfenyl dithiocarbamate and Butyl Eight. Butyl Eight is a rubber accelerator of the dithiocarbamate type, described in "Handbook of Material Trade Names" by Zimmerman and Lavine, 1953 edition, as a brown liquid; specific gravity 1.01; partially soluble in water and gasoline; and soluble in acetone, alcohol, benzol, carbon disulfide and chloroform. Other types of accelerators include NOBS Special described as N-oxydiethylene benzothiazole-2-sulfenamide; and Santocure NS described as N-tert-butyl-2-benzothiazole sulfenamide.

It is to be understood that each of the various types of compounding ingredients may be used singly or mixtures of various ingredients performing a certain function may be employed. It is sometimes preferred, for example to use mixtures of plasticizers rather than a single material.

The various ingredients in the propellant composition may be mixed on a roll mill or an internal mixer such as a Banbury or a Baker-Perkins dispersion blade mixer may be employed. The binder forms a continuous phase in the propellant with the oxidant as the discontinuous phase.

While this invention has been described using as the binder for propellant compositions a copolymer of a conjugated diene with a polymerizable heterocyclic nitrogen base of the pyridine series, such as vinylpyridine and various alkyl-substituted derivatives, it is to be understood that the corresponding quinoline and isoquinoline compounds are also applicable, i.e., vinylquinolines, vinylisoquinolines and various alkyl-substituted derivatives of these compounds.

The following specific examples illustrate and provide a more complete understanding of the invention but are not to be interpreted as unnecessarily limiting the invention.

EXAMPLE I

One part anhydrous nickel chloride added to 100 parts of propellant recipe during mixing caused instantaneous curing of the recipe. The recipe was: 83.5 parts ammonium nitrate, 16.5 parts binder and 4 parts ammonium dichromate. The binder composition was:

100 parts 90/10 copolymer of butadiene and methylvinylpyridine
22 parts Philblack A
20 parts ZP-211 [1]
3 parts Flexamine [2]
3.3 parts magnesium oxide
2 parts Milori blue

[1] ZP-211 sold by Thiokol Corporation is a fraction of TP-90B. TB-90B is a high molecular weight polyether having the formula: $C_4H_9OC_2H_4OCH_2OC_2H_4OC_2H_4OC_2H_9$.
[2] Flexamine is a physical mixture containing 65 percent of a complex diarylamine-ketone reaction product and 35 percent of N,N'-diphenyl-p-phenylenediamine.

For comparative purposes, the following data are presented:

A recipe, A, containing 18 parts binder and 82 parts ammonium nitrate and no curing agent did not cure in 48 hours at 180° F.

A recipe, B, containing 18 parts binder, 82 parts ammonium nitrate and 2.0 parts Milori blue cured to about one-half of its ultimate tensile strength in 12 hours at 180° F.

A recipe, C, containing 18 parts binder, 82 parts ammonium nitrate, 2.0 parts Milori blue and 0.5 part magnesium oxide cured to almost ultimate tensile strength in 24 hours at 180° F. The uncured data showed a higher tensile strength than usual, but it was extrudable initially.

The binder composition of these three recipes was:

100 parts 90/10 copolymer of butadiene and methylvinylpyridine
20 parts ZP-211
Magnesium oxide and Milori blue as indicated above.

Data on these three propellants are given in the following table:

Table I

| Propellant | Curing Agent | Property [1] | Cure time (hrs.) at 180° F. | | | | |
|---|---|---|---|---|---|---|---|
| | | | 0 | 12 | 17 | 24 | 48 |
| A | None | $S_T$ (p.s.i.) | 38 | 49 | 49 | 43 | 44 |
| | | E (percent) | 30 | 9.2 | 10.1 | 10.9 | 11.1 |
| | | E (p.s.i.) | 560 | 930 | 900 | 880 | 1,050 |
| B | 2.0 Milori Blue | $S_T$ (p.s.i.) | 35.7 | 83.3 | 111.2 | 119 | 149 |
| | | E (percent) | 32 | 16 | 14.9 | 15.3 | 17.8 |
| | | E (p.s.i.) | | 1,470 | 2,010 | 2,500 | 2,400 |
| C | 2.0 Milori Blue, 0.5 MgO | $S_T$ (p.s.i.) | 75.9 | 103.9 | 121.5 | 144.4 | 155 |
| | | E (percent) | 20.2 | 16.6 | 15.1 | 14.8 | 10.7 |
| | | E (p.s.i.) | 1,500 | 2,880 | 3,580 | 4,820 | 5,200 |

[1] $S_T$ (p.s.i.) = tensile strength; E (percent) = elongation; E (p.s.i.) = modulus of elasticity Propellants B and C are representative of conventional cure systems which of course do not contain $NiCl_2$.

These data in Example I show that a much faster cure is obtained by adding only one part of nickel chloride to the recipe.

EXAMPLE II

A dark blue material was obtained by heating 13 grams anhydrous nickel chloride with 23.8 grams methylvinylpyridine for 30 minutes at 170° C. The original anhydrous nickel chloride was yellow. The color change was indicative of complex formation. This complex did not cure the methylvinylpyridine butadiene copolymer in a propellant recipe. The propellant recipe was: 83.5 parts ammonium nitrate and 16.5 parts binder. The binder composition was:

100 parts copolymer of butadiene and methylvinylpyridine
22 parts Philblack A
20 parts ZP-211
5 parts magnesium oxide
3 parts Flexamine Two parts of the nickel chloride complex were added to 100 parts of the recipe.

Properties of the propellant cured at 180° F. for the indicated times are given in the following table:

Table II

| Number of Hours | Tensile Strength (p.s.i.) | Elongation (percent) | Modulus (p.s.i.) |
|---|---|---|---|
| 0 | 79 | 18.8 | 765 |
| 17 | 108 | 12.9 | 3,480 |
| 24 | 98 | 13.8 | 1,290 |
| 72 | 112 | 19.8 | 1,970 |

These data show that nickel chloride complexed with methylvinylpyridine (monomer) will not cure a butadiene-methylvinylpyridine copolymer.

EXAMPLE III

Two parts cobalt chloride added to 100 parts of propellant recipe during mixing caused instantaneous curing of the recipe on the roll mill.

The recipe was:

83.5 parts ammonium nitrate
16.5 parts binder
4 parts ammonium dichromate

The binder composition was the same as given in Example II. The ammonium dichromate in the composition of Examples I and III is not a curing agent but is well known as an accelerator for the decomposition of ammonium nitrate.

Certain modifications of the invention will become apparent to those skilled in the art and the illustrative details disclosed are not to be construed as imposing unnecessary limitations on the invention.

I claim:

1. A solid propellant consisting essentially of about 50 to about 90 weight percent of a solid oxidizer admixed with about 10 to about 50 weight percent of a self-curing binder consisting essentially of a rubbery conjugated diene-heterocyclic nitrogen base copolymer, said diene being limited to the range of 4 to 6 carbon atoms per molecule and said nitrogen base being selected from the group consisting of pyridines, quinolines, and isoquinolines having only one

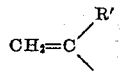

substituent wherein R' is selected from the group consisting of hydrogen and methyl, a curing agent comprising at least one water-soluble salt of at least one metal of the group consisting of Ni and Co, and at least one oxide of a metal of the group consisting of Mg and Zn.

2. A solid propellant consisting essentially of about 50 to about 90 weight percent of ammonium nitrate admixed with 10 to 50 weight percent of a binder consisting essentially of a rubbery self-curing conjugated diene-heterocyclic nitrogen base copolymer, said diene being limited to the range of 4 to 6 carbon atoms per molecule and said nitrogen base being selected from the group consisting of pyridines, quinolines, and isoquinolines having only one

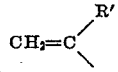

substituent wherein R' is selected from the group consisting of hydrogen and methyl, a curing agent comprising at least one water soluble salt of at least one metal of the group consisting of Ni and Co, and magnesium oxide.

3. The propellant of claim 2 including a plasticizer, an antioxidant, and a burning rate catalyst.

4. The propellant of claim 3 including a reinforcing agent.

5. The propellant of claim 2 wherein said copolymer comprises butadiene and methylvinylpyridine.

6. The propellant of claim 2 wherein said copolymer has a Mooney viscosity in the range of 10–100 (ML–4) and is prepared by the polymerization of a mixture of the monomers containing at least 50 weight percent of the diene.

7. A solid propellant consisting essentially of from 50 to 90 weight percent of a solid oxidizer and from 10 to 50 weight percent of a self-curing binder, said binder consisting essentially of a rubbery copolymer of a conjugated diene and a heterocyclic nitrogen base, said diene being limited to the range of 4 to 6 carbon atoms per molecule and said nitrogen base being selected from the group consisting of pyridines, quinolines, and isoquinolines having only one

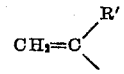

substituent wherein R' is selected from the group consisting of hydrogen and methyl, a curing agent comprising at least one water-soluble salt of at least one metal of the group consisting of Ni and Co, at least one oxide of a metal of the group consisting of Mg and Zn, a burning rate catalyst, a plasticizer, a reinforcing agent, and an antioxidant.

8. The propellant of claim 7 wherein said oxidizer comprises ammonium nitrate, said copolymer comprises a copolymer of butadiene and methylvinylpyridine, and said binder includes a minor proportion of Milori blue and of magnesium oxide.

9. The propellant of claim 8 including a nickel salt.
10. The propellant of claim 8 including nickel chloride.
11. The propellant of claim 8 including a cobalt salt.
12. The propellant of claim 8 including cobalt chloride.

13. A process for reducing the curing time of a self-curing propellant binder consisting essentially of a rubbery copolymer of a conjugated diene and a heterocyclic nitrogen base, said diene being limited to the range of 4 to 6 carbon atoms per molecule and said nitrogen base being selected from the group consisting of pyridines, quinolines, and isoquinolines having only one

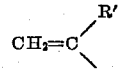

substituent wherein R' is selected from the group consisting of hydrogen and methyl, and at least one metal oxide of the group consisting of Mg and Zn, which comprises admixing with said binder between .05 and 10 weight percent (based on said binder) of at least one water soluble salt of at least one metal of the group consisting of Ni and Co so as to reduce the curing time of said binder.

14. The process of claim 13 wherein said binder includes minor proportions of Milori blue and magnesium oxide.

15. The process of claim 14 wherein said salt comprises a nickel salt.

16. The process of claim 14 wherein said salt comprises nickel chloride.

17. The process of claim 14 wherein said salt comprises a cobalt salt.

18. The process of claim 14 wherein said salt comprises cobalt chloride.

References Cited in the file of this patent

UNITED STATES PATENTS

| | | |
|---|---|---|
| 2,395,506 | Sauser | Feb. 26, 1946 |
| 2,561,814 | Novotny et al. | July 24, 1951 |